Dec. 20, 1932.    W. P. COX    1,891,753
ROLLER BEARING
Filed Oct. 5, 1931
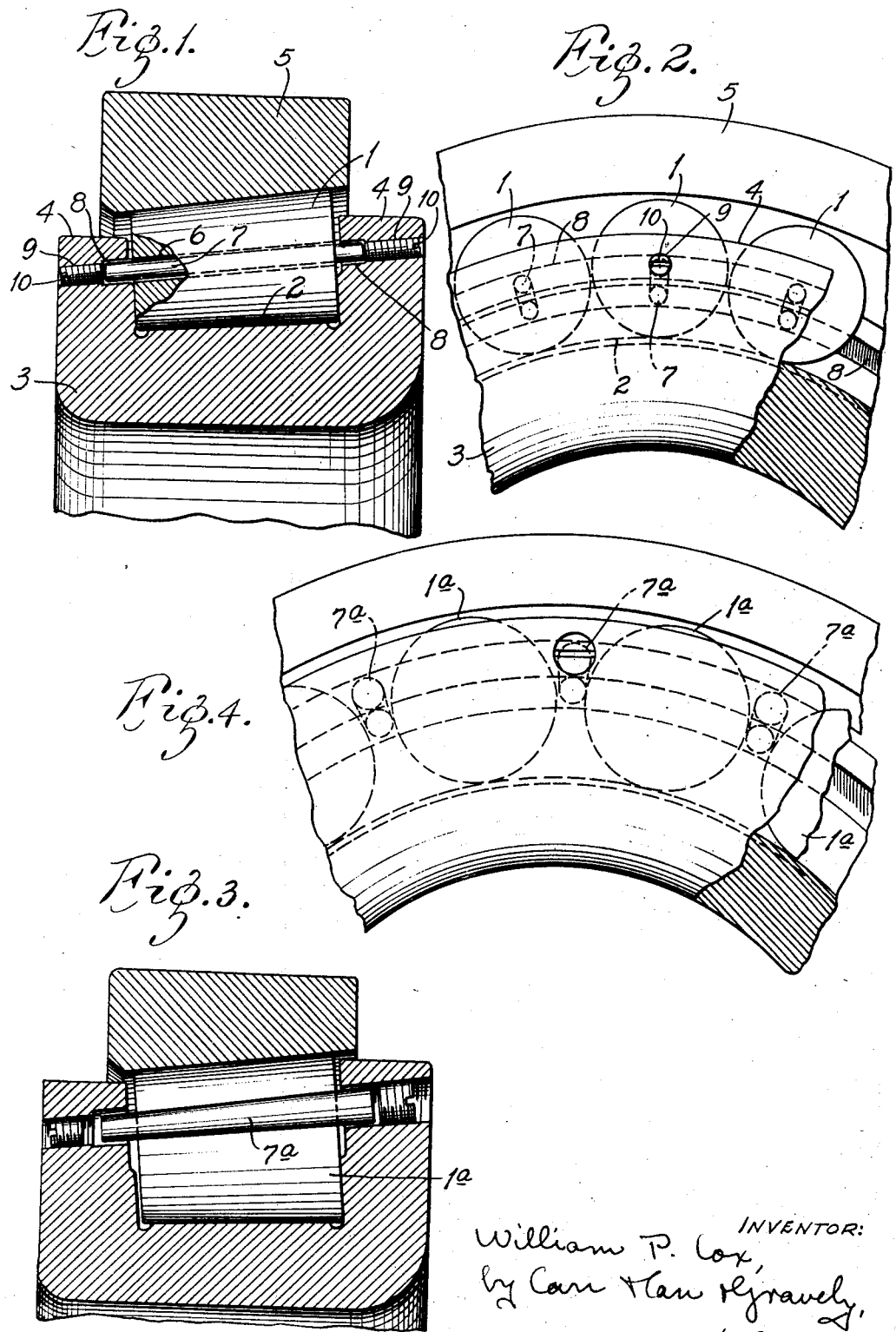
INVENTOR:
William P. Cox,
by Carr Han Gravely,
HIS ATTORNEYS.

Patented Dec. 20, 1932

1,891,753

UNITED STATES PATENT OFFICE

WILLIAM P. COX, OF CANTON, OHIO, ASSIGNOR TO THE TIMKEN ROLLER BEARING COMPANY, OF CANTON, OHIO, A CORPORATION OF OHIO

ROLLER BEARING

Application filed October 5, 1931. Serial No. 566,893.

My invention relates to roller bearings and has for its principal object a construction that dispenses with the usual cage, that reduces friction and that maintains the rollers in proper running position. The invention consists principally in providing the inner bearing member with portions at each end overlapping the ends of the rollers and provided with annular grooves adapted to receive roller positioning pins. The invention further consists in the roller bearing, and in the parts and combinations and arrangements of parts hereinafter described and claimed.

In the accompanying drawing:

Fig. 1 is a sectional view of a roller bearing embodying my invention,

Fig. 2 is a partial end view with a portion of the inner bearing member broken away, and Figs. 3 and 4 are views similar to Figs. 1 and 2, respectively, showing a modified form of the invention.

In the form illustrated in Fig. 1, conical rollers 1 are mounted on the conical raceway portion 2 of an annular inner bearing member or cone 3, said inner bearing member being provided with upstanding ribs 4 at its end that overlap the ends of said rollers 1. An annular cup 5 or outer bearing member is mounted on the circular series of rollers. The rollers 1 are each provided with an axial hole 6 through which extends a pin 7 that projects from each end of the roller. The ends of said pins 7 are mounted in annular grooves 8 provided in said upstanding rib portions 4.

To facilitate assembly and disassembly, one or both of said rib members are provided with threaded holes 9 therethrough in endwise alinement with a position assumed by said pins 7. Thus the rollers 1 may be mounted one at a time on the inner bearing member 3 with their axial holes 6 in alinement with said threaded bores, a positioning pin 7 mounted in each roller and the rollers moved away from the pin mounting position. After the rollers have all been positioned on the inner bearing member, said threaded holes may be closed by headless screws 10, whose inner ends are brought flush with the rear walls of said grooves.

In the modified form of bearing shown in Figs. 3 and 4, the roller positioning pins 7a are mounted between adjacent rollers, solid rollers 1a being illustrated in the drawing. These pins are located radially outward of the cone defined by the axes of the rollers, thereby holding the rollers on the inner bearing member. Preferably said pins 7a are of conical form so as to have true rolling contact with the sides of the rollers.

The above described constructions dispense with the cages usually required, minimize friction, permit easy disassembly and re-assembly without destroying any part of the bearing and are economical to manufacture. The rollers are guided at both ends by ribs and by maintaining roller length and the distance between ribs within close limits a very accurate and smooth running bearing is obtained. Preferably the clearance between roller and rib is about .005 inch.

Obviously, numerous changes may be made without departing from the invention and I do not wish to be limited to the precise construction shown.

What I claim is:

1. A roller bearing comprising a bearing member, an annular series of rollers thereon, said bearing member having integral upstanding portions overlapping the ends of said rollers and provided with annular grooves, positioning pins extending from said rollers and running in said grooves, one of said upstanding portions having a hole therethrough to permit assembly of said rollers and pins and means for closing said hole.

2. A tapered roller bearing comprising an inner bearing member having a conical raceway portion, conical rollers mounted on said raceway portion, said inner bearing member having upstanding ribs overlapping the ends of said rollers and provided with annular grooves, pins for positioning said rollers, said pins having their ends loosely mounted in said annular grooves, said ribs having holes therethrough alining with a position assumed by one of said pins and communicating with said groove and means for closing said holes.

3. A tapered roller bearing construction comprising an inner bearing member having a conical raceway and integral upstanding rib portions, conical rollers running on said raceway and provided with axial holes therethrough, said upstanding ribs being provided with annular grooves alined with the ends of said axial holes and pins extending through said axial holes into said grooves.

4. A tapered roller bearing construction comprising an inner bearing member having a conical raceway and integral upstanding rib portions, conical rollers running on said raceway and provided with axial holes therethrough, said upstanding ribs being provided with annular grooves alined with the ends of said axial holes, pins extending through said axial holes into said grooves, one of said rib portions having a hole therethrough to permit assembly of said rollers and pins and means for closing said holes.

Signed at Canton, Ohio, this 28th day of Sept. 1931.

WILLIAM P. COX.